United States Patent
Sleszynski

(10) Patent No.: US 11,883,782 B2
(45) Date of Patent: Jan. 30, 2024

(54) FORWARD OSMOSIS SYSTEM EMPLOYING IMPROVED DRAW FLUID

(71) Applicant: Pureline Treatment Systems, LLC, Bensenville, IL (US)

(72) Inventor: Neal Sleszynski, Lebanon, OR (US)

(73) Assignee: Pureline Treatment Systems, LLC, Bensenville, IL (US)

( * ) Notice: Subject to any disclaimer, the term of this patent is extended or adjusted under 35 U.S.C. 154(b) by 0 days.

(21) Appl. No.: 16/990,771

(22) Filed: Aug. 11, 2020

(65) Prior Publication Data
US 2022/0047992 A1 Feb. 17, 2022

(51) Int. Cl.
*B01D 61/00* (2006.01)
*B01D 61/02* (2006.01)
*B01D 61/58* (2006.01)
*C02F 1/44* (2023.01)

(52) U.S. Cl.
CPC ......... *B01D 61/005* (2013.01); *B01D 61/025* (2013.01); *B01D 61/58* (2013.01); *C02F 1/441* (2013.01); *C02F 1/445* (2013.01); *B01D 2311/25* (2013.01); *B01D 2311/2673* (2013.01)

(58) Field of Classification Search
CPC .... B01D 61/005; B01D 61/025; B01D 61/58; B01D 2311/2673; C02F 1/441; C02F 1/445
See application file for complete search history.

(56) References Cited

U.S. PATENT DOCUMENTS

2013/0220927 A1* 8/2013 Moody ............... B01D 61/005
 210/652
2014/0319056 A1* 10/2014 Fuchigami ............. C02F 1/445
 210/648

(Continued)

FOREIGN PATENT DOCUMENTS

JP 03127757 A * 5/1991
WO WO-2018200538 A1 * 11/2018 ............. C12C 11/11

OTHER PUBLICATIONS

Yamashita, Akira—JP-03127757—A machine translation—May 1991 (Year: 1991).*

(Continued)

*Primary Examiner* — Bradley R Spies
(74) *Attorney, Agent, or Firm* — Smyrski Law Group, A P.C.

(57) ABSTRACT

A forward osmosis system is provided. The system includes forward osmosis container having a semipermeable membrane dividing the forward osmosis chamber into a first chamber and a second chamber, a draw solution water removal unit including a quantity of draw solution solvent and water, wherein the draw solution solvent includes a nonaqueous liquid and a condenser configured to receive either water vapor or draw solution solvent vapor from the draw solution water removal unit and provide condensed draw solution solvent to the second chamber. The second chamber provides a water diluted draw solution solvent to the draw solution water removal unit. The first chamber takes in received water including a dissolved solute at an input mass per unit of volume and provides a fluid output having an output mass per unit of volume greater than the input mass per unit of volume.

17 Claims, 9 Drawing Sheets

(56) References Cited

U.S. PATENT DOCUMENTS

2017/0136414 A1* 5/2017 Ide ............................ C02F 1/445
2020/0140797 A1* 5/2020 Havel ....................... C12H 3/04

OTHER PUBLICATIONS

Cai, et al., "A Critical Review on Draw Solutes Development for Forward Osmosis," Desalination 391, 2016, pp. 16-29.

Johnson, et al., "Osmotic's Potential: An Overview of Draw Solutes for Foward Osmosis," Desalination 434, 2018, pp. 100-120.

Cai, et al., "A Critical Review on Draw Solutes Development for Forward Osmosis," Revised, Desalination 391, 2016, pp. 16-29.

Yasukawa, et al., "Effect of Molecular Weight of Draw Solute on Water Permeation in Forward Osmosis Process," I&EC Research, 2015.

Li, et al., "Smart Draw Agents for Emerging Forward Osmosis Application," Journal of Materials Chemistry A, 2013.

McCutcheon, et al., "Desalination by Ammonia-Carbon Dioxide Forward Osmosis: Influence of Draw and Feed Solution . . . ," Journal of Membrane Science 278, 2006, pp. 114-123.

Yong, et al., "Coupled Reverse Draw Solute Permeation and Water Flux in Forward Osmosis with Neutral Draw Solutes," Journal of Membrane Science 392-393, 2012, pp. 9-17.

Luo, et al., "A Review on the Recovery Methods of Draw Solutes in Forward Osmosis," Journal of Water Process Engineering 4, 2014, pp. 212-223.

Alejo, et al., "Advances in Draw Solutes for Forward Osmosis: Hybrid Organic-Inorganic Nanoparticles and Conventional . . . ," Chemical Engineering Journal 309, 2017, pp. 738-752.

McCutcheon, et al., "A Novel Ammonia-Carbon Dioxide Forward (direct) Osmosis Desalination Process," Desalination 174, 2005, pp. 1-11.

McGinnis, et al., "Pilot Demonstration of the NH3/CO2 Forward Osmosis Desalination Process on High Salinity Brines," Desalination 312, 2013, pp. 67-74.

* cited by examiner

FORWARD OSMOSIS SYSTEM EMPLOYING IMPROVED DRAW FLUID

BACKGROUND

I. Field

The present invention relates generally to producing clean water from contaminated water or water containing dissolved solids, and more particularly, to the process of forward osmosis and the materials employed in forward osmosis systems.

II. Background

Many technologies are employed to recover usable water from contaminated water. Each has a required level of energy to accomplish the task. Numerous systems employ a form of osmosis, the process of selectively passing solvent molecules through a semipermeable membrane. Concentrations on each side of the membrane are equalized when solvent molecules pass from a less concentrated solution into a more concentrated solution.

As used herein, the terms "osmosis" and "forward osmosis" are used synonymously, while the term "reverse osmosis" is a different process than osmosis and forward osmosis. Reverse osmosis is the situation where solvent passes through a porous membrane in the direction opposite to that for forward osmosis when subjected to a pressure greater than a pressure called the osmotic pressure, representing a minimum level of pressure needed to be applied to a solution to prevent inward flow of the pure solvent across the semipermeable membrane. Thus the application of pressure, requiring energy, is necessary for successful reverse osmosis.

In the water purification setting, systems have been developed that employ the technique of forward osmosis. Forward osmosis uses a semipermeable membrane, and the force for separation of water from dissolved solutes is the osmotic pressure gradient, where a draw solution of high concentration solute is used to "draw" a net flow of water through the semipermeable membrane from the process feedwater and into the draw solution. The result is selective removal of water from the feed water solutes.

As with reverse osmosis, recovering water from the diluted draw solution requires a level of energy. Higher concentrations of dissolved solids require more energy, and higher percentages of recovered water also require more energy. When recovering water from the draw solution, forward osmosis in general does not provide an energy advantage over reverse osmosis, but often improves the reliability and decreases the amount of necessary maintenance of coupled technologies, such as reverse osmosis or evaporation techniques.

With generally equivalent energy requirements, a system or process that could reduce the amount of energy required to produce clean water from contaminated water, or water containing dissolved solids, such as salts, may be beneficial.

SUMMARY

The following presents a simplified summary in order to provide a basic understanding of some aspects of the claimed subject matter. This summary is not an extensive overview and is not intended to identify key/critical elements or to delineate the scope of the claimed subject matter. Its sole purpose is to present some concepts in a simplified form as a prelude to the more detailed description that is presented later.

According to an embodiment of the present design, there is provided a forward osmosis container comprising a semipermeable membrane dividing the forward osmosis chamber into a first chamber and a second chamber, an draw solution water removal unit comprising a quantity of draw solution solvent, wherein the draw solution solvent comprises a nonaqueous liquid having a boiling point lower than water, and a condenser configured to receive draw solution solvent vapor from the draw solution water removal unit and provide condensed draw solution solvent from the condenser to the second chamber. The second chamber provides a water diluted draw solution solvent to the draw solution water removal unit. The first chamber takes in received water comprising a dissolved solute at an input mass per unit of volume, and provides a fluid output having an output mass per unit of volume greater than the input mass per unit of volume.

According to a further embodiment of the present design, there is provided a method for purifying received water comprising a dissolved solute, comprising evaporating a quantity of draw solution solvent in an draw solution water removal unit, thereby forming evaporated draw solution solvent, wherein the draw solution solvent comprises a nonaqueous liquid having a boiling point lower than water, condensing the evaporated draw solution solvent, thereby forming condensed draw solution solvent, providing condensed draw solution solvent to a second chamber of a forward osmosis container comprising a semipermeable membrane dividing the forward osmosis chamber into a first chamber and the second chamber, wherein the second chamber provides a water diluted draw solution solvent to the draw solution water removal unit; and providing the received water at an input mass per unit of volume to the first chamber and providing a fluid output having an output mass per unit of volume greater than the input mass per unit of volume.

According to another embodiment of the present design, there is provided a forward osmosis system comprising a forward osmosis container comprising a semipermeable membrane dividing the forward osmosis chamber into a first chamber and a second chamber, wherein the first chamber intakes received water comprising a dissolved solute at an input parts per million level and provides a fluid output having an output parts per million level greater than the input parts per million level, a draw solution water removal unit comprising a quantity of water and a quantity of draw solution solvent, wherein the draw solution solvent comprises a nonaqueous liquid having a first boiling point greater than water, and a condenser configured to receive water vapor from the draw solution water removal unit and provide undiluted draw solution solvent to the second chamber, wherein the second chamber provides a water diluted draw solution solvent to the draw solution water removal unit.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
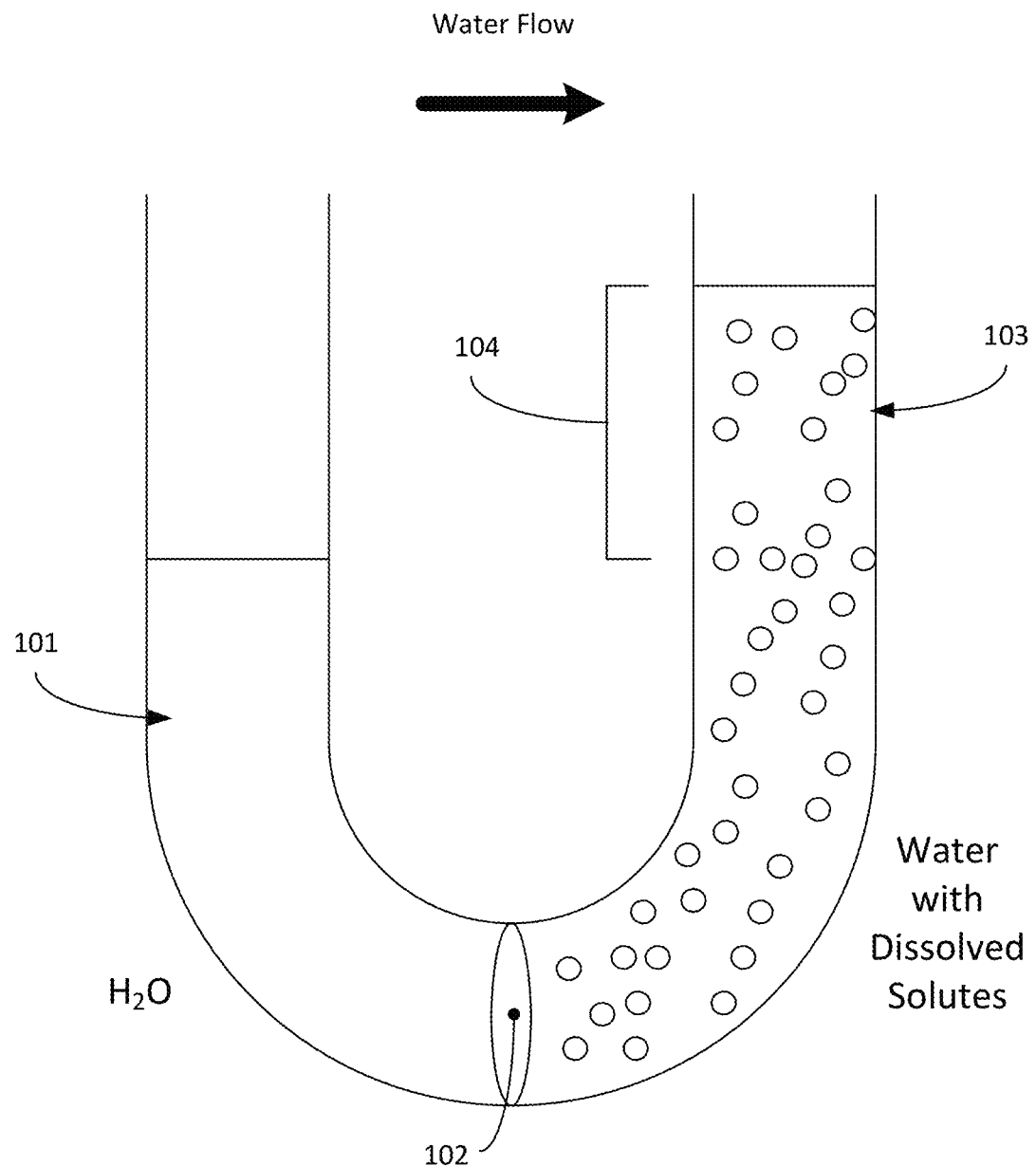
FIG. 1 illustrates a tubular osmosis arrangement including liquids including water and received water, e.g. ground water or salt water, separated by a semipermeable membrane.

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make or use the invention, and not to limit the scope of legal protection afforded the invention, which is defined by the claims and their equivalents.

The present design comprises an apparatus and method employable in the replacement of a reverse osmosis arrangement used to produce clean water from contaminated water or water containing dissolved solids, such as salts. The present design replaces the draw solution used in the forward osmosis process with an organic solvent or an aqueous solution having a high concentration of a liquid having a high vapor pressure and a low boiling point, or alternately, with a liquid having a low vapor pressure and high boiling point using a different set of components. The present design uses typical components previously employed in forward osmosis, but with a different draw solution.

The present design comprises an apparatus and method employable as a replacement for current reverse osmosis technology used to produce clean water from contaminated water or water containing dissolved solids, such as salts. The present design replaces current reverse osmosis systems with a forward osmosis system that incorporates a low energy evaporation step to recover pure water from the draw solution. The draw solution used in this forward osmosis process is an organic solvent or an aqueous solution having a high concentration of a dissolved liquid material having a high vapor pressure and a low boiling point. The present design uses typical components previously employed in forward osmosis, but with a different draw solution.

Different implementations may be employed in accordance with the teachings of the present design. For example, certain solutions may be employed having a boiling point greater than water, while others with a boiling point less than water may be beneficially employed. Further, evaporation hardware, in the form of a draw solution water removal unit such as an evaporation unit, may operate under reduced pressures. The present design may be employed with water obtained or received from the ground, i.e. produced water or groundwater, or may be employed with other sources including water needing to be purified into clean water, such as salt water or industrial waste water. In most instances, the water or liquid received includes a dissolved solute and/or certain contaminants, where the solute may be salt, for example. Other types of received water may be employed in accordance with the teachings provided herein.

The present design could be provided as a standalone system or could be employed with an in place existing system with certain enhancements, either in the liquids or components employed or with different or additional hardware.

FIG. 1 illustrates the general osmosis process science, not used in water purification. On the left, pure water 101, with semipermeable membrane 102 and received water 103, which comes up from the ground, for example, in this example containing 50,000 ppm NaCl (sodium chloride), representing the amount of total dissolved solids (TDS), 4.34 eq/L in this arrangement. Osmotic pressure 104 is shown representing the minimum level of pressure applicable to a solution to prevent inward flow of the pure solvent across the semipermeable membrane 102.

Figure 2:
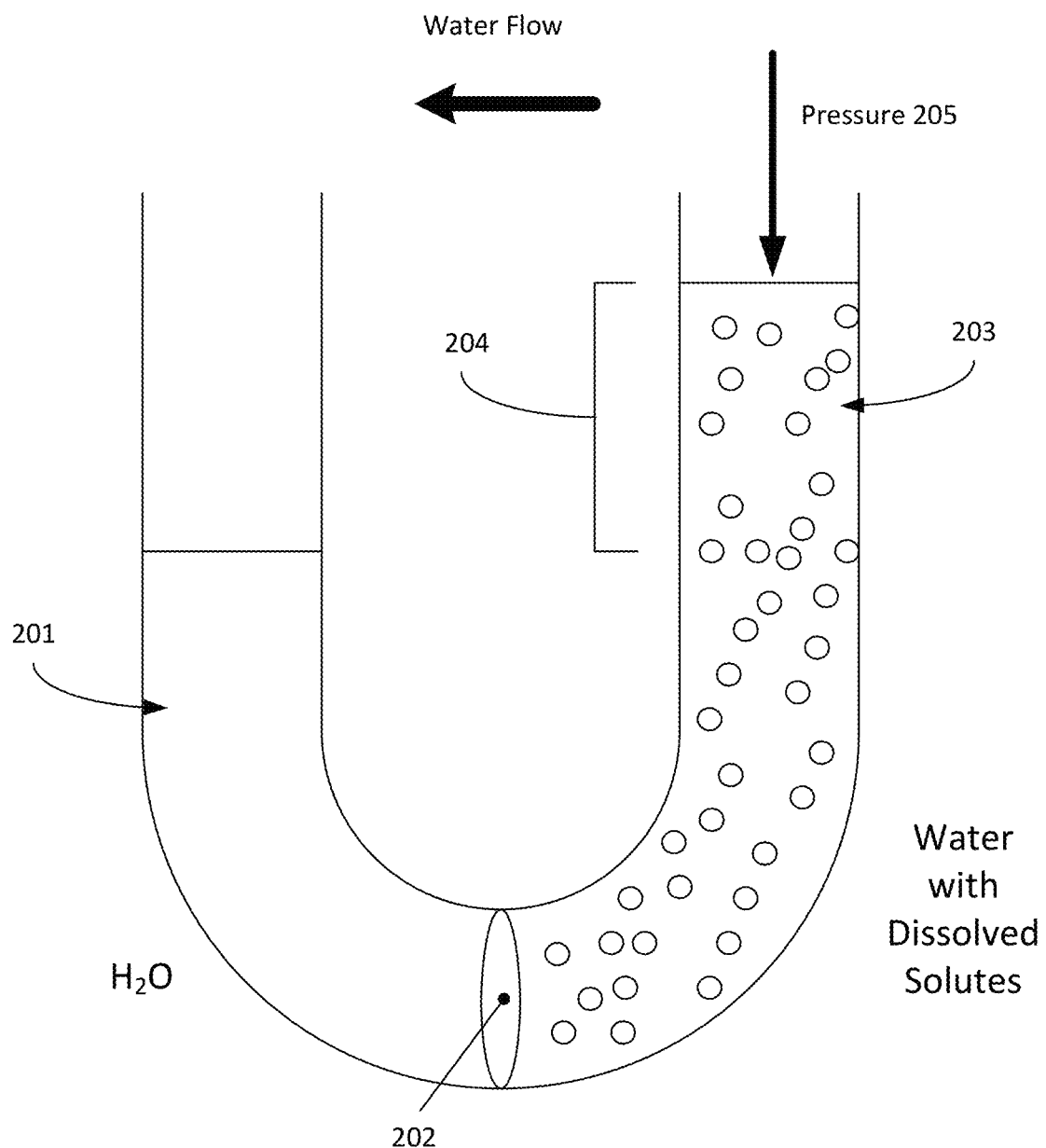
FIG. 2 shows reverse osmosis in an arrangement similar to that of FIG. 1, with pressure applied to received water.

FIG. 2 illustrates the reverse osmosis situation, with similar components to those shown in FIG. 1, including pure water 201, semipermeable membrane 202, and received water 203 containing 50,000 ppm NaCl (sodium chloride), 4.34 eq/L. Again, osmotic pressure 204 is shown, but in reverse osmosis, pressure 205 is applied, typically a mechanical pressure, and the pure water passes through semipermeable membrane 202 in the direction opposite to that for typical osmosis (reverse osmosis passing right to left in this orientation) when subjected to pressure 205.

Figure 3:
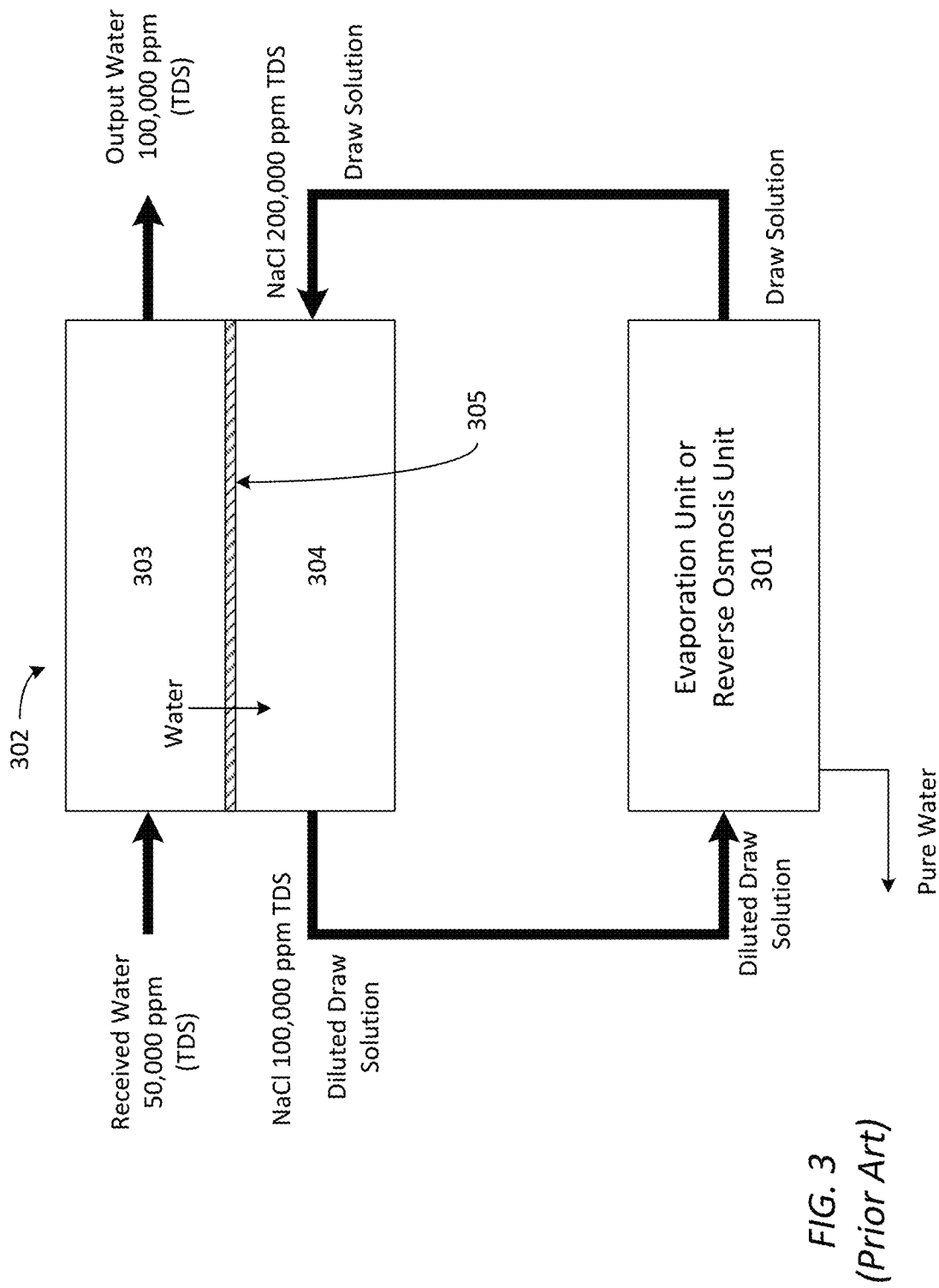
FIG. 3 shows a simple version of current forward osmosis technology.

Forward osmosis is a known process and one example of a system employing forward osmosis is shown in FIG. 3. The energy input is a draw solution water removal unit, such as an evaporation unit 301 or alternately a reverse osmosis unit (not shown), employing a draw solution, shown to pass to forward osmosis vessel 302, and specifically to second chamber 304 of forward osmosis vessel 302. In one embodiment, NaCl (sodium chloride solution) passes from evaporation unit 301 to second chamber 304 at 200,000 ppm and passes from second chamber 304 back to evaporation unit 301 at 100,000 ppm. Second chamber 304 is separated from first chamber 303 by semipermeable membrane 305, and in this arrangement received water is provided at 50,000 ppm to first chamber 303, and output water having 100,000 ppm passes from first chamber 303. Initially, no energy input is required, but in water purification, the system uses more energy to evaporate the water from the recirculating draw solution or to perform reverse osmosis.

While the water received at the left of first chamber 303 is called received water and the water provided from the right side of first chamber 303 is called output water in this representation, it is to be understood that the water received may contain dissolved solutes, including but not limited to salts and contaminants, and the resultant output water provided on the right side has increased TDS and is similar but different from the received water on the left side of first chamber 303.

Figure 4:
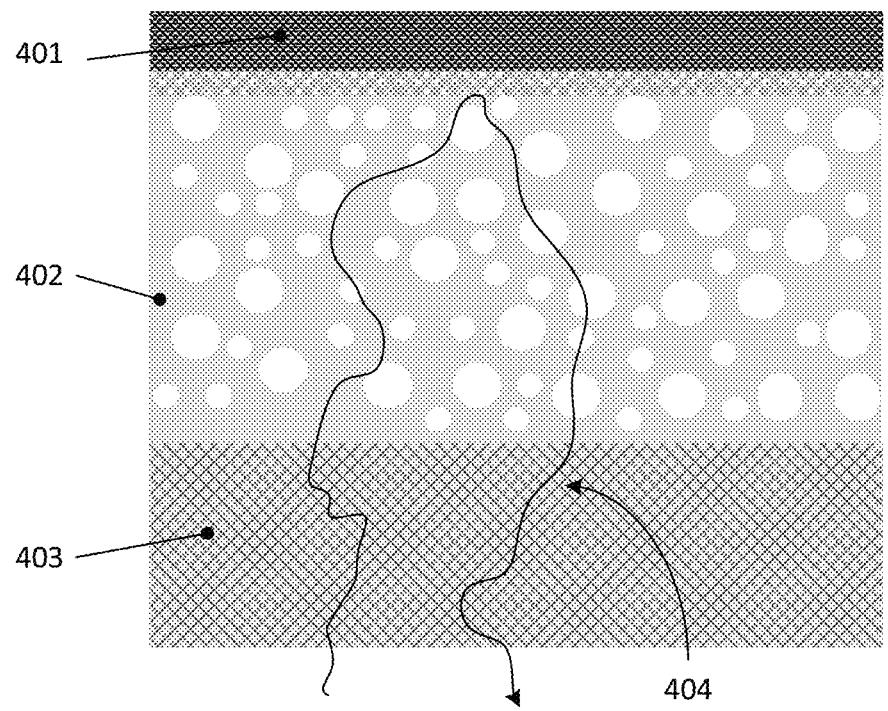
FIG. 4 illustrates semipermeable membrane layers employed in a reverse osmosis situation.
Figure 5:
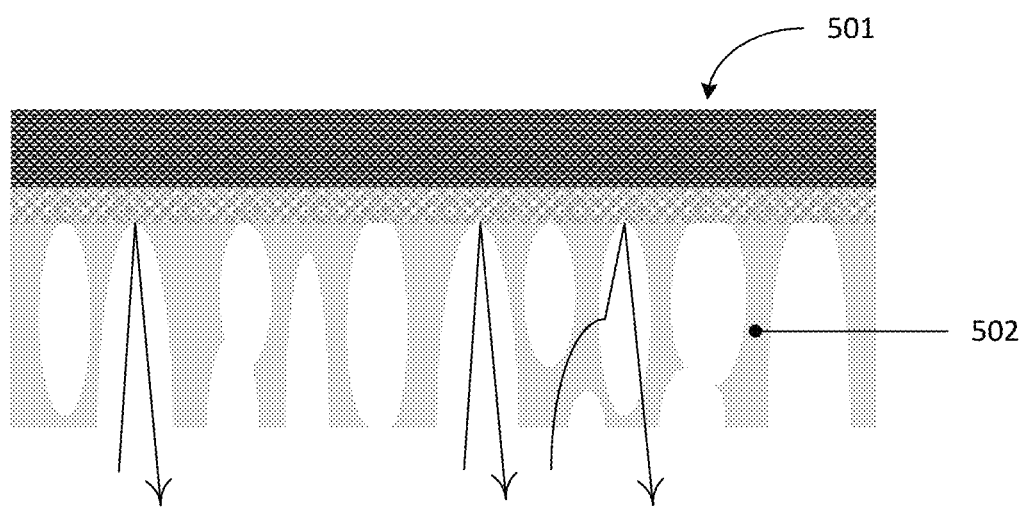
FIG. 5 is a semipermeable membrane employed in a forward osmosis arrangement such as that shown in FIG. 3.

Semipermeable membranes employed in reverse osmosis and forward osmosis are shown in FIGS. 4 and 5. From FIG. 4, active layer 401 is provided atop first support layer 402 and second support layer 403. Such reverse osmosis layers can withstand relatively high pressures, but decreases mass transport efficiency, thus requiring more energy. Membrane fouling is a significant issue. The path(s) 404 shown in FIG. 4 represent the path of passage in a reverse osmosis situation.

FIG. 5 illustrates an example of a semipermeable membrane employed in forward osmosis. Active layer 501 sits above support layer 502, having large openings provided therein, thus providing minimal resistance, enabling enhanced mass transport and operation with no applied pressure as compared with reverse osmosis. Alternatively a modest amount of pressure can be applied, much lower than the pressure required in reverse osmosis, to increase the rate of water transport through the membrane, in a new configuration referred to as "pressure enhanced forward osmosis." Overall, forward osmosis can provide a faster and easier system when compared with reverse osmosis, with less energy required when compared with reverse osmosis. Less fouling occurs and the semipermeable membrane tends to be easier to clean.

The semipermeable membrane in forward and reverse osmosis processes can be identical or may differ. The reverse osmosis semipermeable membrane requires an extensive support structure to mechanically support the membrane since the membrane is exposed to very high pressure differentials during reverse osmosis. Such a support structure can negatively affect water transport across the membrane, causing a large energy penalty. In forward osmosis, the system typically applies minimal or zero pressure. The forward osmosis support structure is simplified, reducing the energy penalty in moving the fluid, e.g. water.

Figure 6A:
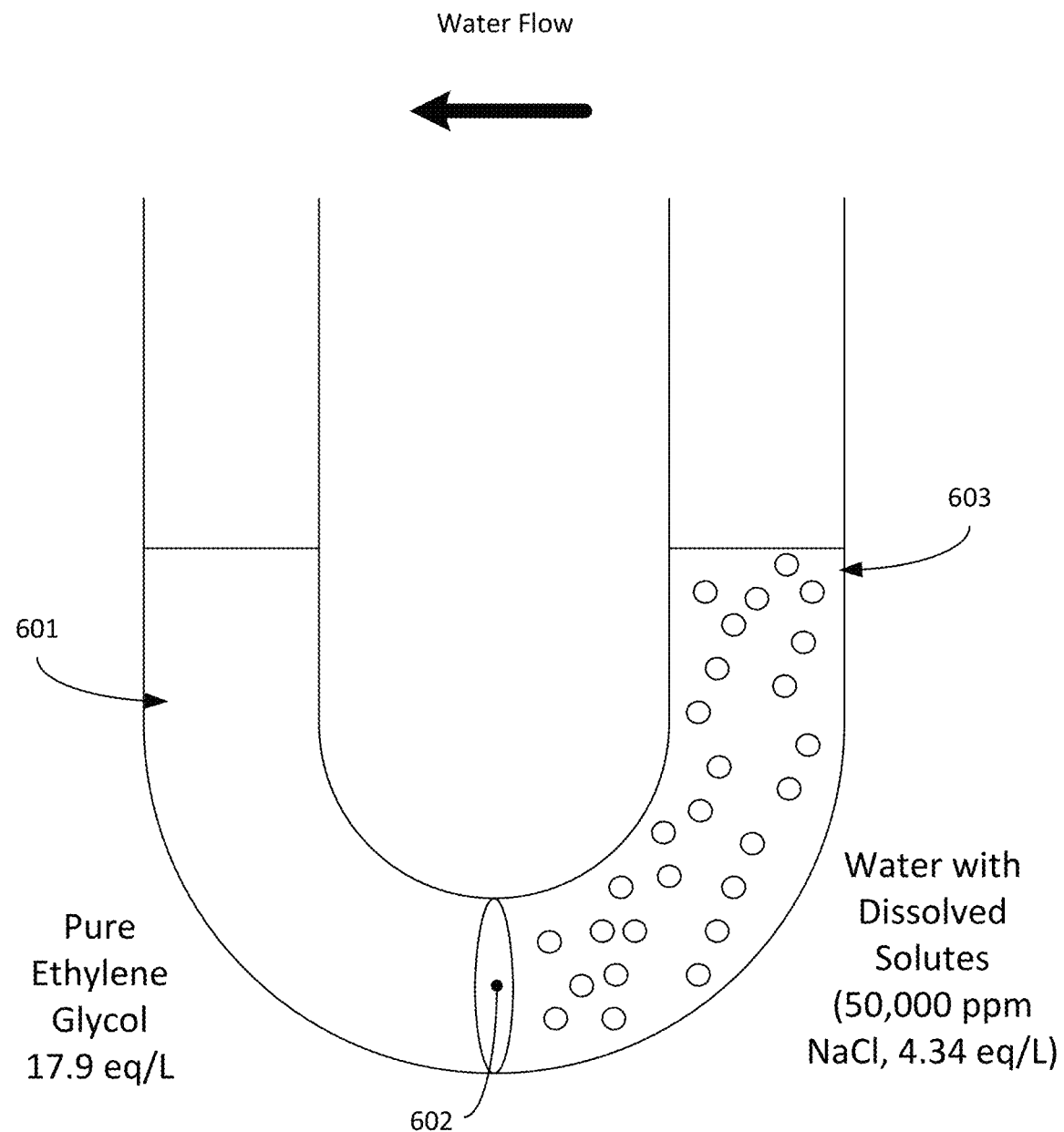
FIG. 6A illustrates a tubular arrangement employing ethylene glycol (17.9 eq/L) with received water.

FIG. 6A illustrates a new example of forward osmosis for separation. From FIG. 6A, ethylene glycol 601 is provided at a given level, e.g. 17.9 eq/L for pure ethylene glycol, with received water 603 having a solute concentration at 4.34 eq/L in this example. Energy favors the side of the semipermeable membrane with the higher concentration of non-water components, not just salts. The use of ethylene glycol in this example can result in forward osmosis, shown by the arrow from right to left above the device. No pressure is required.

Figure 6B:
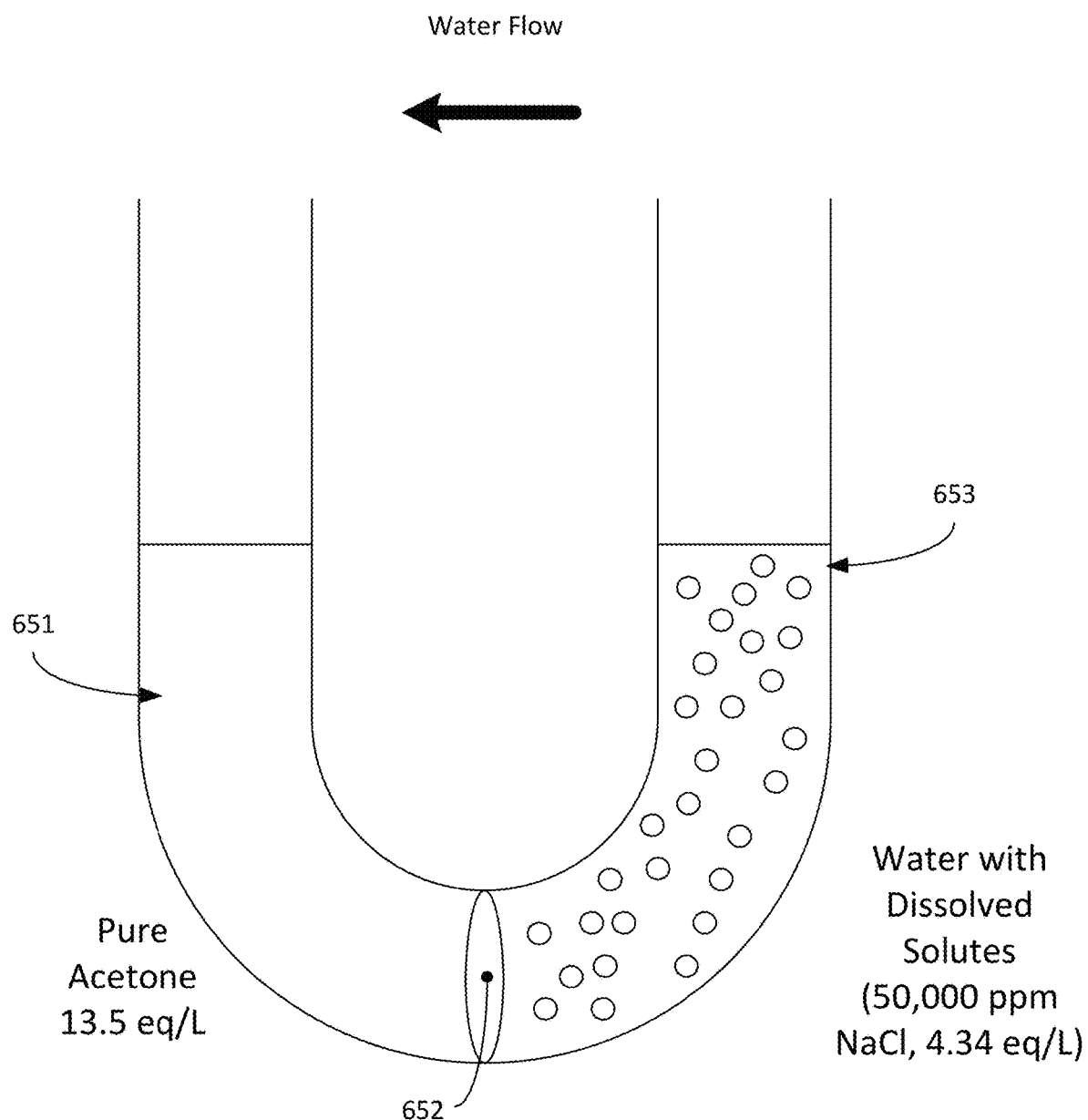
FIG. 6B shows a tubular arrangement employing acetone (13.5 eq/L) with received water.

A similar arrangement is provided in FIG. 6B. From FIG. 6B, pure acetone 651 is provided at 13.5 eq/L, with received water 652 at 4.34 eq/L solute concentration in this example.

Draw solutions in the past have varied. The most common draw solutions used in forward osmosis have tended to be inorganic salts such as NaCl, as such salts are inexpensive, readily available and provide the necessary osmotic pressure for various applications. Certain other draw solutes have been considered, such as polymers and organic molecules, nanoparticles, hydrogels, metathesis precipitable salts, soluble gases, volatile liquids, $NH_4HCO_3$, polarity switchable draw solutes, and thermally responsive molecules. See, "A critical review on draw solutes development for forward osmosis," Yufeng Cai, et al., Desalination 391 (2016), pages 16-29. Problems exist with virtually all of these draw solutions, ranging from cost and scarcity, to difficulty in use, to inherent inefficiencies in acting as draw solutions, to high energy inputs necessary to remove water from the draw solution.

The energy input required in a forward osmosis system is to remove water from the draw solution. The present design seeks to reduce the energy requirement to evaporate water and effectuate osmosis in water treatment situation. One possible liquid that may be employed in an energy saving arrangement is acetone. Pure acetone has a concentration of 13.5 eq/L, but other concentrations may be provided.

Figure 7:
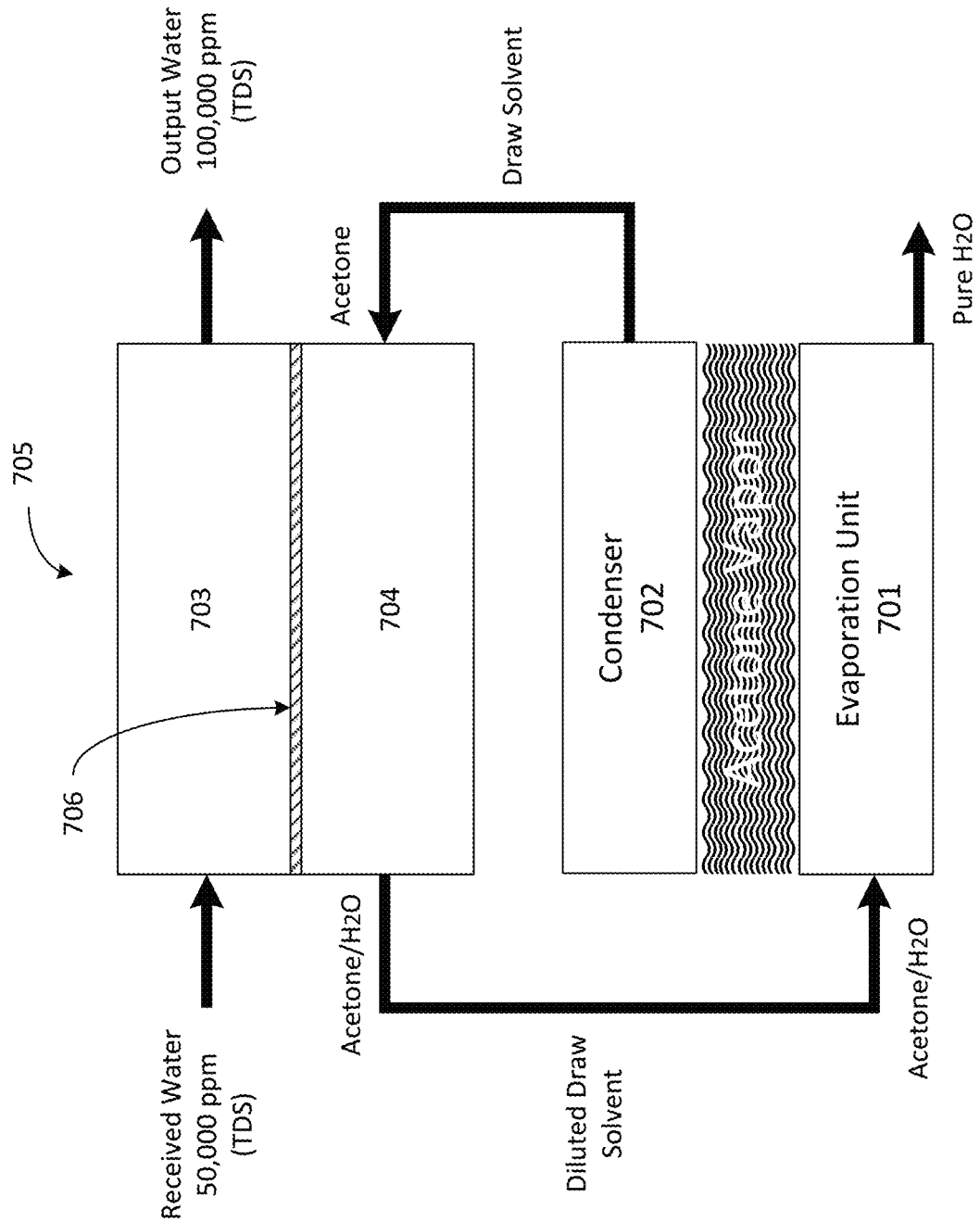
FIG. 7 illustrates a forward osmosis arrangement according to the present design using acetone as the draw solution solvent.

FIG. 7 illustrates a construct employing acetone rather than salts. From FIG. 7, evaporation or distillation unit 701 employs an amount of acetone and likely some water and evaporates the solution, providing acetone vapor to condenser 702. The acetone vapor typically contains no water, and the condensed acetone collected at condenser 702 may be provided from condenser 702 to second chamber 704 of forward osmosis vessel 705 as a draw solvent. The combination of acetone and water is circulated back to evaporation or distillation unit 701. Second chamber 704 is separated from first chamber 703 by semipermeable membrane 706. Again, first chamber 703 takes in received water at 50,000 ppm and provides treated water at 100,000 ppm, where such ppm (parts per million) values represent dissolved solute values. The device, and specifically the evaporation or distillation unit 701 of FIG. 7, may operate at or above the boiling point of acetone, 56 degrees centigrade rather than the 100 degree centigrade boiling point of water. The device of FIG. 7 evaporates and collects the evaporated acetone with a lower level of necessary energy applied. The result is a lower overall energy requirement.

Acetone presents certain risks and challenges, including the fact that many membranes and adhesives cannot tolerate acetone and will result in failure of such components. Another possibility considered was tetrahydrofuran (THF) with a boiling point of 66 degrees centigrade. Further possibilities are the use of ammonia ($NH_3$) or ammonia derivatives. The use of $NH_3$, combined with water to form $NH_4OH$, in a tubular construct similar to that of FIG. 6, yields a quantity of $NH_4OH$ at 14.8 eq/L on the left side of the tubular arrangement and received water with 50,000 ppm NaCl at 4.34 eq/L on the right of the semipermeable membrane, with forward osmosis taking place.

Figure 8:
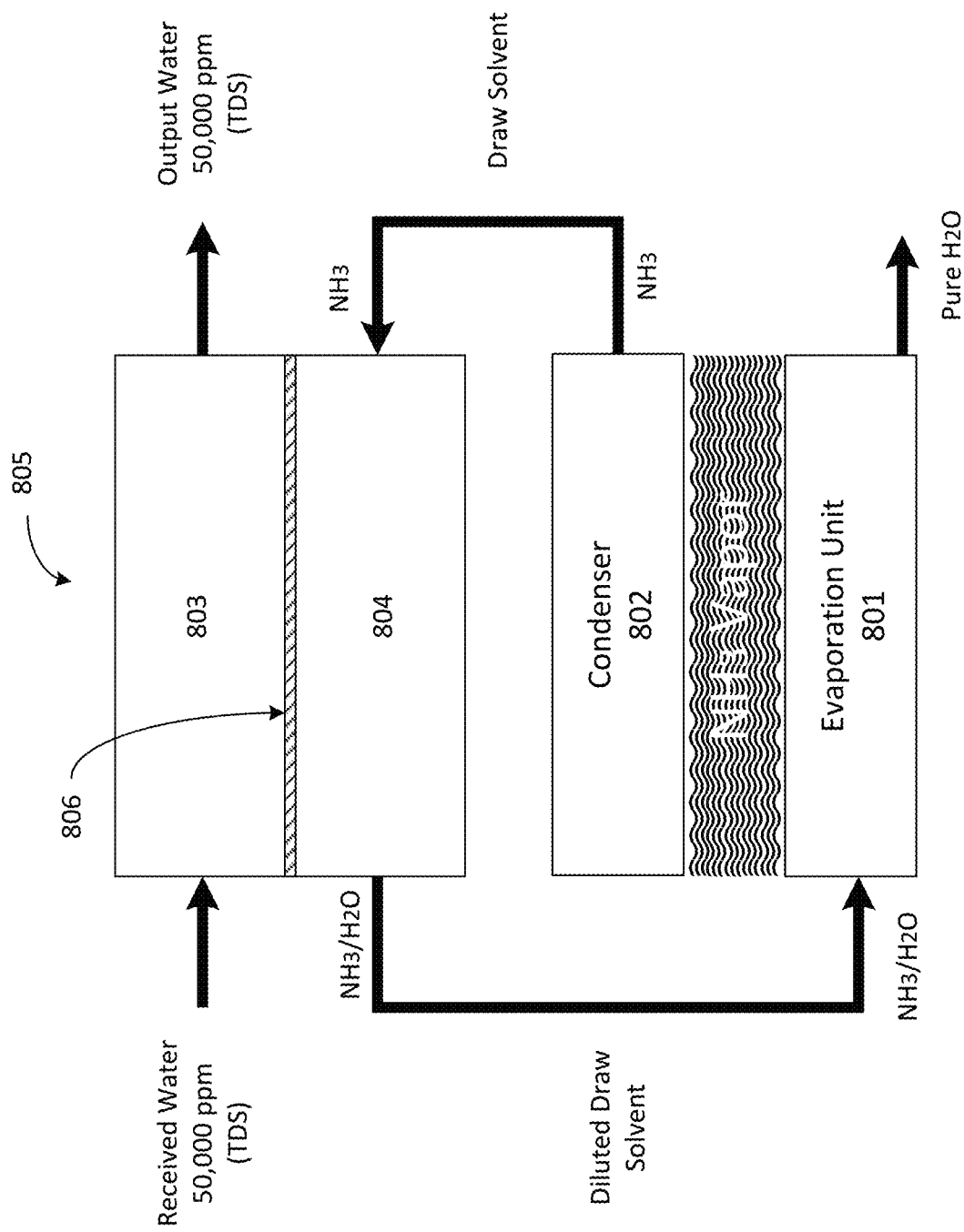
FIG. 8 shows a forward osmosis arrangement according to the present design using ammonia ($NH_3$) as the draw solution solvent.

FIG. 8 illustrates a similar setup to that shown in FIG. 7, but employing $NH_3$ as the draw fluid. From FIG. 8, evaporation or distillation unit 801 employs an amount of ammonia and likely some water and evaporates the ammonia, providing ammonia vapor to condenser 802. Ammonia is one example, but ammonia derivatives such as monomethylamine, dimethylamine, and trimethylamine can be used in place of ammonia Ammonia has been shown to be small enough that some passes through some forward osmosis membranes, contaminating the output water. The ammonia derivatives (monomethylamine, dimethylamine, and trimethylamine) are larger molecules less likely to pass through the membrane. The evaporated ammonia (or ammonia derivative) and vapor typically contains no water. In the ammonia example, the condensed evaporated ammonia is provided as a draw solvent from condenser 802 to second chamber 804 of forward osmosis vessel 805. The combination of ammonia and possibly water is circulated back to evaporation or distillation unit 801. First chamber 803 takes in received water at 50,000 ppm and provides received water at 100,000 ppm, and first chamber 803 is separated from second chamber 804 by semipermeable membrane 806. As with all representations disclosed herein, TDS values such as 50,000 ppm and 100,000 ppm are for illustrative purposes only, and other values may be provided. The device of FIG. 8 operates at the boiling point of ammonia, −33.3 degrees centigrade (negative 33.3), rather than the 100 degree centigrade boiling point of water, thus lowering the necessary energy level required. In the embodiment of FIG. 8, trace amounts of $NH_4OH$ resulting in the product water ($H_2O$ plus $NH_3$ yields $NH_4OH$) may be neutralized with $HNO_3$, producing $NH_4NO_3$, usable as fertilizer.

In the representations of FIGS. 7 and 8, the evaporation units depicted may operate at a reduced pressure level.

Element 301 is labeled as an evaporation unit, but may alternately or additionally comprise a reverse osmosis unit, and this applies to the various embodiments provided herein.

Figure 9:
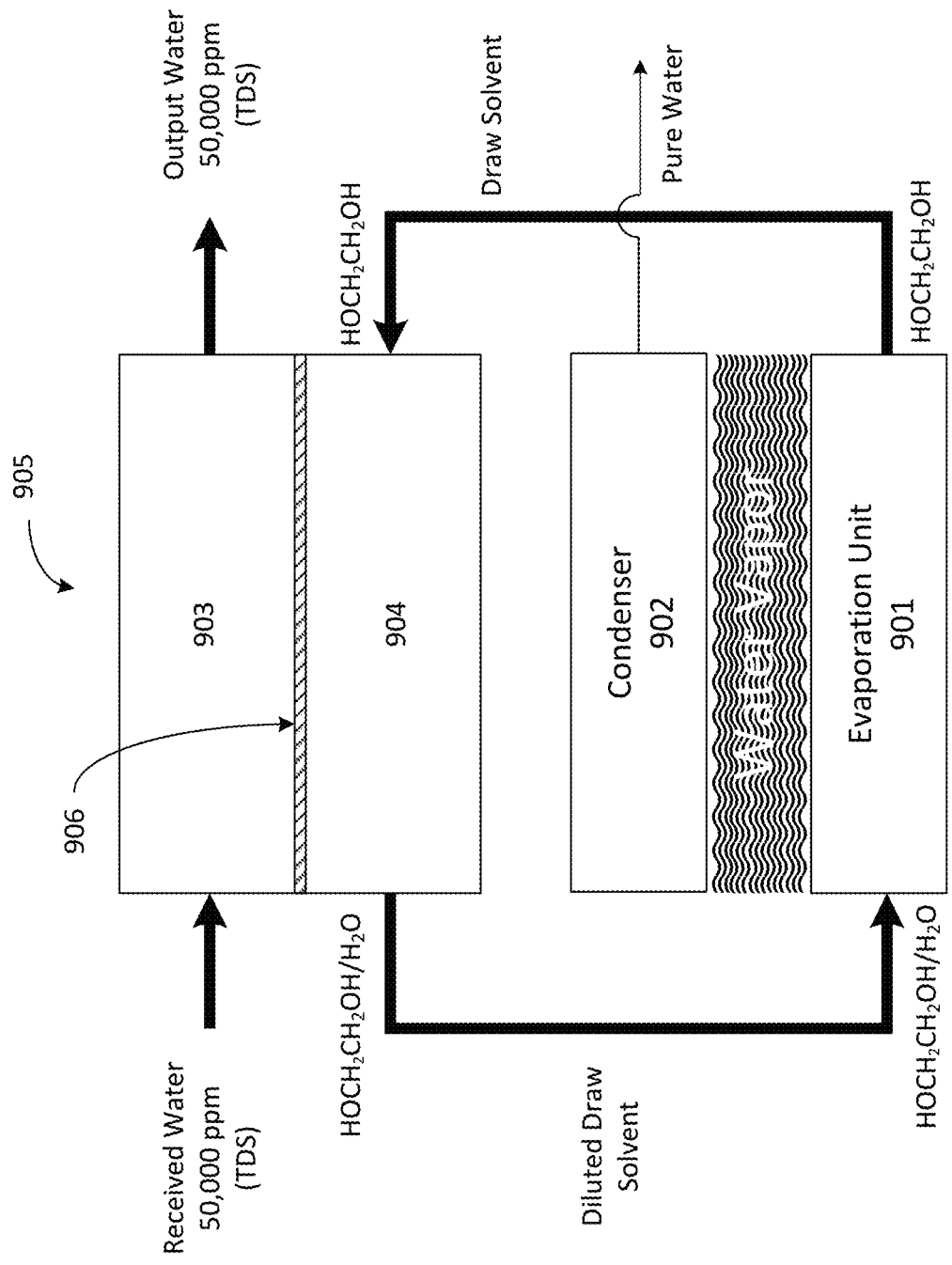
FIG. 9 is an embodiment employing ethylene glycol, having a boiling point higher than water, resulting in generation of water vapor that is condensed in the condenser.

FIG. 9 shows a further embodiment according to the present design wherein ethylene glycol ($HOCH_2CH_2OH$) is employed. In this embodiment, evaporation or distillation unit 901 employs an amount of ethylene glycol with water and evaporates the solution, providing water vapor to condenser 902. The boiling point of ethylene glycol is higher than that of water, and thus water vapor evaporates from evaporation unit 901. The resultant product from evaporation unit 901 is ethylene glycol, which is provided as a draw solvent that passes to second chamber 904 of forward osmosis vessel 905. The combination of ethylene glycol and water is circulated back to evaporation or distillation unit 901. First chamber 904 takes in received water, in this example at 50,000 ppm and provides output water at 100,000 ppm, and first chamber 903 is separated from second chamber 904 by semipermeable membrane 906. The evaporation unit of FIG. 9 operates at the boiling point of water, 100 degrees centigrade, or at reduced pressure.

Thus in the present design, the draw solution used in forward osmosis is a non-aqueous solvent. Use of a non-aqueous draw solution replaces the former draw solutions employing an aqueous solution of salts or other dissolved solids. The solvent may be selected from various classes of compounds such as primary alcohols (including but not limited to methanol, ethanol, propanol, butanol, and so forth), secondary alcohols (including but not limited to isopropanol, isobutanol, and so forth), tertiary alcohols (including but not limited to t-butanol and so forth), poly-ols (including but not limited to ethylene glycol, propylene glycol, glycerol, and so forth), aldehydes (including but not limited to formaldehyde, acetaldehyde, propanal, and so forth), ketones (including but not limited to acetone, butanone, butadione, and so forth), carboxylic acids (including but not limited to formic acid, acetic acid, propanoic acid, and so forth), as well as amines (including but not limited to ammonia, methyl amine, dimethyl amine, trimethylamine, and triethyl amine and so forth) and/or organic solvents (including but not limited to dimethyl ether, diethyl ether, methyl tert-butyl ether, acetone, methanol, ethanol, iso-propanol, tert-butanol, n-propanol, butanone, tetrahydrofuran, trifluoroacetic acid, ethyl acetate, acetonitrile, formic acid, methyl amine, dimethyl amine, trimethylamine, ethyl amine, diethyl amine, triethyl amine, alkyl amines, dioxane, iso-butanol, pyridine, n-butanol, formic acid, acetic acid, dimethyl formamide, dimethyl acetamide, dimethyl sulfoxide, ethylene glycol, diethylene glycol, glycerine, propylene glycol, diglyme, nitromethane, and butyl acetate, and so forth).

Alternately, the draw solution may be in an aqueous solution having a relatively high concentration of a substance having a relatively low boiling point and high vapor pressure. Examples include, but are not limited to, at least one from classes of compounds including primary alcohols, secondary alcohols, tertiary alcohols, esters, poly-ols, aldehydes, ketones, carboxylic acids, amines, ionic liquids, and organic solvents. By relatively low boiling point, it is intended that the substance have a boiling point below that of water, or less than 100 degrees centigrade. By relatively high concentration, it is intended that the device operate at varying levels of concentration in the system, including in the forward osmosis chamber and in the evaporation or distillation unit, but in one embodiment, concentrations of above 50 percent may be realized in all components of the system, in others over 30 percent, and in still others, over 60, 70, 75, 80, 85, or 90 percent, and in some, above 92, 95, 97 or 99 percent concentrations. An amount of water, or other elements, may be present in the circulating draw solution at any given time. More than one compound, component, and/or class of compound may be employed in the system.

During the recycling of the diluted draw solution, the low boiling point component is typically removed by evaporation, boiling, distillation, or fractional distillation using temperatures below the boiling point of water, 100 degrees centigrade. Such an operation may be conducted at atmospheric pressure or under reduced pressure. The remaining liquid is typically pure water. Vapor produced is condensed and recycled.

Alternately, water may be removed by evaporation, boiling, or distillation. Compounds may be employed having a boiling point greater than that of water, wherein operation may be conducted at atmospheric pressure or under reduced pressure. The remaining liquid is typically a pure or near pure solution of the non-water compound employed, where water vapor produced is condensed and drawn off.

Thus whenever the draw solvent has a low boiling point, the evaporator/condenser produces solvent, and when the solvent has a high boiling point the evaporator/condenser produces water.

Although forward osmosis proceeds according to embodiments of the present design without the application of external pressure, performance improvements may be realized in certain situations by the application of modest amounts of pressure on the received water side of the forward osmosis apparatus, referred to as pressure enhanced forward osmosis. Such application of pressure typically improves the transport of water through the membrane, while not requiring the much higher pressures necessary in traditional reverse osmosis systems. Typical pressures during reverse osmosis may reach 300 to 1000 psi, requiring significant membrane and/or membrane support structure. The lower level of applied pressure provided during pressure enhanced forward osmosis decreases the need for cumbersome and expensive membrane related equipment.

Thus according to the present design, forward osmosis is performed, either as a method or a system, using a non-aqueous liquid as a draw solution. Previous draw solutions have employed water as a solvent and some type of solute dissolved in the water. Salt has been frequently used as the solute. If the two materials are both liquids, the one present in higher concentration is defined as the solvent, i.e. in a solution which is 55% water and 45% alcohol, water is the solvent and alcohol is the solute. In a solution which is 55% alcohol and 45% water, alcohol is the solvent and water is the solute. The present design contemplates a pure liquid from the liquids presented above as the draw solution solvent, and this draw solution solvent will pick up water as the solute as it passes through the forward osmosis cell or container. The present design may employ a solvent having a boiling point higher or lower than that of water. Such a design reduces the amount of energy required to separate the water and draw solution solvent.

According to an embodiment of the present design, there is provided a forward osmosis container comprising or containing a semipermeable membrane dividing the forward osmosis chamber into a first chamber and a second chamber, a draw solution water removal unit comprising a quantity of draw solution solvent, wherein the draw solution solvent comprises a nonaqueous liquid having a boiling point lower than water, and a condenser configured to receive draw solution solvent vapor from the draw solution water removal unit and provide condensed draw solution solvent from the condenser to the second chamber. The second chamber provides a water diluted draw solution solvent to the draw solution water removal unit. The first chamber takes in received water comprising a dissolved solute at an input mass per unit of volume and provides a fluid output having an output mass per unit of volume greater than the input mass per unit of volume.

According to a further embodiment of the present design, there is provided a method for purifying received water comprising a dissolved solute comprising evaporating a quantity of draw solution solvent in a draw solution water removal unit, thereby forming evaporated draw solution solvent, wherein the draw solution solvent comprises a nonaqueous liquid having a boiling point lower than water, condensing the evaporated draw solution solvent, thereby forming condensed draw solution solvent, providing condensed draw solution solvent to a second chamber of a forward osmosis container comprising a semipermeable membrane dividing the forward osmosis chamber into a first chamber and the second chamber, wherein the second chamber provides a water diluted draw solution solvent to the draw solution water removal unit; and providing the received water at an input mass per unit of volume to the first chamber and providing a fluid output having an output mass per unit of volume greater than the input mass per unit of volume.

According to another embodiment of the present design, there is provided a forward osmosis system comprising a forward osmosis container comprising a semipermeable membrane dividing the forward osmosis chamber into a first chamber and a second chamber, wherein the first chamber intakes received water comprising a dissolved solute at an input parts per million level and provides a fluid output having an output parts per million level greater than the input parts per million level, a draw solution water removal unit comprising a quantity of water and a quantity of draw solution solvent, wherein the draw solution solvent comprises a nonaqueous liquid having a boiling point greater than water, and a condenser configured to receive water vapor from the draw solution water removal unit and provide undiluted draw solution solvent to the second chamber, wherein the second chamber provides a water diluted draw solution solvent to the draw solution water removal unit.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A forward osmosis system, comprising:
   a forward osmosis container comprising a semipermeable membrane dividing the forward osmosis chamber into a first chamber and a second chamber;
   a draw solution water removal unit comprising a quantity of draw solution solvent, wherein the draw solution solvent comprises a nonaqueous liquid having a boiling point lower than water; and
   a condenser positioned above the draw solution water removal unit, the condenser configured to collect draw solution solvent vapor evaporated upward from the draw solution water removal unit, condense received evaporated draw solution solvent vapor into condensed anhydrous liquid draw solution solvent, and provide the condensed anhydrous liquid draw solution solvent from the condenser to the second chamber;
   wherein the second chamber provides a water diluted draw solution solvent to the draw solution water removal unit;
   wherein the first chamber takes in received water comprising a dissolved solute at an input mass per unit of volume and provides a fluid output having an output mass per unit of volume greater than the input mass per unit of volume.

2. The forward osmosis system of claim 1, wherein the draw solution water removal unit comprises a quantity of water in addition to the quantity of draw solution solvent.

3. The forward osmosis system of claim 1, wherein the nonaqueous liquid having the boiling point lower than water comprises at least one from classes of compounds comprising primary alcohols, secondary alcohols, tertiary alcohols, poly-ols, aldehydes, ketones, amides, carboxylic acids, amines, and organic solvents.

4. The forward osmosis system of claim 3, wherein the organic solvents comprise one selected from the group consisting of dimethyl ether, diethyl ether, methyl tert-butyl ether, acetone, methanol, ethanol, iso-propanol, tert-butanol, n-propanol, propanone, butanone, tetrahydrofuran, trifluoroacetic acid, ethyl acetate, acetonitrile, glyme, formic acid, methyl amine, dimethyl amine, trimethylamine, ethyl amine, diethyl amine, triethyl amine, and alkyl amines.

5. The forward osmosis system of claim 1, wherein the draw solution solvent is over 50% of solution in the draw solution water removal unit.

6. The forward osmosis system of claim 1, wherein the draw solution water removal unit comprises an evaporation unit.

7. The forward osmosis system of claim 1, wherein the draw solution water removal unit comprises a reverse osmosis unit.

8. The forward osmosis system of claim 1, wherein the draw solution water removal unit further produces a quantity of clean water.

9. A method for purifying received water comprising a dissolved solute, comprising:
   evaporating a quantity of draw solution solvent in a draw solution water removal unit, thereby forming evaporated draw solution solvent, wherein the draw solution solvent comprises a nonaqueous liquid having a boiling point lower than water;

collecting evaporated draw solution solvent at a condenser positioned above the draw solution water removal unit, the condenser positioned and configured to receive draw solution solvent evaporated upward from the draw solution water removal unit;

condensing the evaporated draw solution solvent from a gaseous state to a liquid state, thereby forming anhydrous liquid condensed draw solution solvent;

providing the anhydrous liquid condensed draw solution solvent to a second chamber of a forward osmosis container comprising a semipermeable membrane dividing the forward osmosis chamber into a first chamber and the second chamber, wherein the second chamber provides a water diluted draw solution solvent to the draw solution water removal unit; and providing the received water at an input mass per unit of volume to the first chamber and providing a fluid output having an output mass per unit of volume greater than the input mass per unit of volume.

10. The method for purifying water of claim 9, wherein the draw solution water removal unit comprises a quantity of water in addition to the quantity of draw solution solvent.

11. The method for purifying water of claim 9, wherein the nonaqueous liquid having the boiling point lower than water comprises at least one from classes of compounds comprising primary alcohols, secondary alcohols, tertiary alcohols, poly-ols, aldehydes, ketones, carboxylic acids, amines, and organic solvents.

12. The method for purifying water of claim 11, wherein the organic solvents comprise one selected from the group consisting of dimethyl ether, diethyl ether, methyl tert-butyl ether, acetone, methanol, ethanol, iso-propanol, tert-butanol, n-propanol, propanone, butanone, tetrahydrofuran, trifluoroacetic acid, ethyl acetate, acetonitrile, formic acid, methyl amine, dimethyl amine, trimethylamine, ethyl amine, diethyl amine, triethyl amine, and alkyl amines.

13. The method for purifying water of claim 9, wherein the draw solution water removal unit comprises an evaporation unit or a reverse osmosis unit.

14. A forward osmosis system, comprising:
a forward osmosis container comprising a semipermeable membrane dividing the forward osmosis chamber into a first chamber and a second chamber, wherein the first chamber intakes received water comprising a dissolved solute at an input parts per million level and provides a fluid output having an output parts per million level greater than the input parts per million level;

a draw solution water removal unit comprising a quantity of water and a quantity of draw solution solvent, wherein the draw solution solvent comprises a non-aqueous liquid having a boiling point greater than water; and a condenser positioned above the draw solution water removal unit, the condenser configured to collect draw solution solvent vapor evaporated upward from the draw solution water removal unit, condense collected evaporated draw solution solvent vapor from a gaseous state into a liquid state thereby forming anhydrous liquid draw solution solvent, and provide the anhydrous liquid draw solution solvent to the second chamber;

wherein the second chamber provides a water diluted draw solution solvent to the draw solution water removal unit.

15. The forward osmosis system of claim 14, wherein the nonaqueous liquid having the boiling point greater than water comprises at least one from classes of compounds comprising primary alcohols, secondary alcohols, tertiary alcohols, poly-ols, aldehydes, ketones, carboxylic acids, amines, and organic solvents.

16. The forward osmosis system of claim 15, wherein the organic solvents comprise one selected from the group consisting of dioxane, iso-butanol, pyridine, n-butanol, formic acid, acetic acid, dimethyl formamide, dimethyl acetamide, dimethyl sulfoxide, ethylene glycol, diethylene glycol, glycerine, propylene glycol, diglyme, nitromethane, and butyl acetate.

17. The forward osmosis system of claim 14, wherein the draw solution water removal unit comprises an evaporation unit or a reverse osmosis unit.

* * * * *